United States Patent Office 3,460,424
Patented Aug. 12, 1969

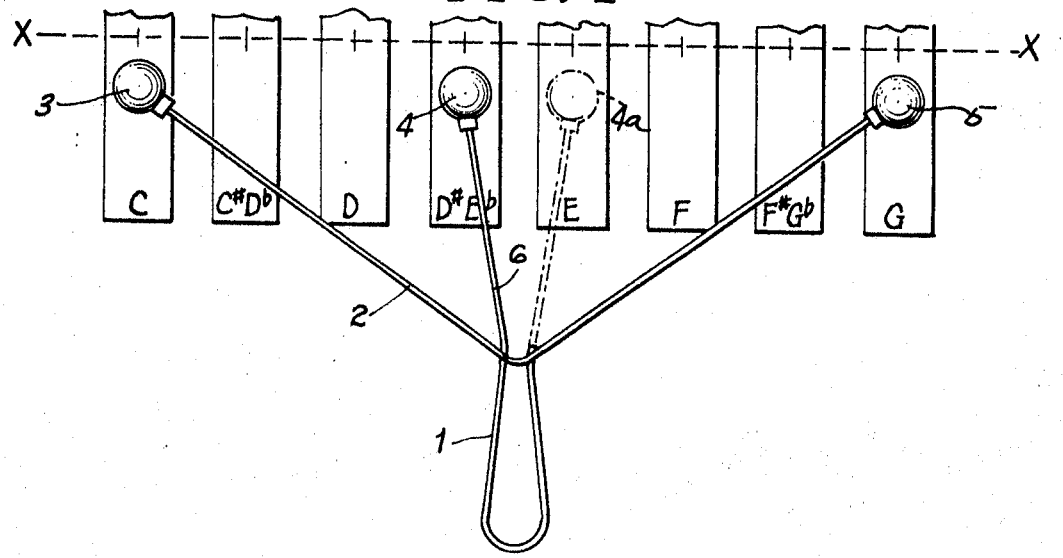
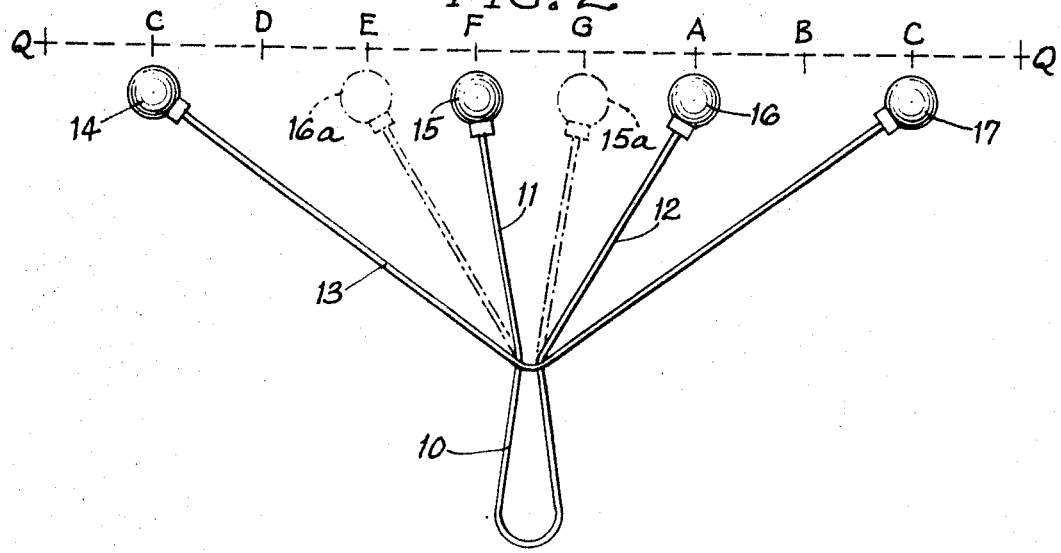

3,460,424
CHORD-STRIKING MALLET
Richard I. Tepper, Niles, Ill., assignor to Scientific Music Industries, Inc., a corporation of Illinois
Filed Aug. 11, 1967, Ser. No. 659,932
Int. Cl. G10d 13/08
U.S. Cl. 84—404                                    1 Claim

ABSTRACT OF THE DISCLOSURE

A mallet for striking a plurality of bells, or other tone-making devices, with one stroke of the mallet to create a chord. The mallet comprises at least three striking heads affixed to a handle, which striking heads are in spaced relationship and coplanar with each other in an asymmetrical arrangement. The mallet can be used with bells which are arranged in such a way as to permit the mallet to strike different chords by rotating it about the handle axis. Typically, the arrangement of the striking heads of the mallet is linear and asymmetrical, so that a rotation of the mallet by 180 degrees about its handle axis will cause the striking heads to assume a different configuration with respect to a linear arrangement of bells, and different chords can be struck.

Background of the invention

Although music is an age-old art, and the methods of teaching it are many and varied, only a small minority of the population have any familiarity with the nature of harmonics, although such a familiarity is helpful in appreciating and playing music.

In particular, children, many of whom study music, have difficulty in understanding the relationships between notes and how chords can be classified, as well as why some chords are harmonious and others dissonant, and since they are unfamiliar with chord structure and relationships, they experience difficulty in playing musical instruments. Often they can become discouraged, and eventually abandon their musical efforts.

This invention provides a device which permits musical novices to play chords on arrangements of tone-making devices, particularly those which are arranged in a chromatic scale, introducing them to the basic structure of and relationships between chords.

Summary of the invention

The mallet of this invention comprises at least three striking heads affixed to a handle, the striking heads being spaced one from the other and colinear with each other in an asymmetrical arrangement. This mallet can be used to strike chords on arrangements of tone-making devices of various sorts, e.g. resonator bells such as those found in metal xylophones, cylindrical chimes such as are found in a marimba, or conventional bells. For convenience, the entire class of such tone-making devices will be referred to as "bells."

An advantage of the mallet of this invention is that when it is rotated by 180 degrees about an axis perpendicular to the line of striking heads, the heads present a different spatial arrangement with respect to the arrangement of bells. In this new position, the mallet will strike an entirely different series of chords.

The mallet of this invention can be used as a teaching device. When a scale, typically a chromatic scale, of bells is arranged in linear order, a child, or another pupil, can use the mallet of this invention to determine for himself by experimentation how many different chords can be struck by the mallet of this invention simply by moving the heads of the mallet along the scale to strike different bells. He can also determine what chords are related to each other by noting which can be produced by the mallets, as the heads of the mallet remain in fixed spatial relationship to each other. From this, a pupil can begin to grasp the tenet of musical theory that chords can be classified by the number of tonal steps which separate the individual notes of the chord.

The drawing

FIGURE 1 discloses a side view of one embodiment of a chord striking mallet of this invention having three striking heads, the mallet being shown resting upon a series of resonator bells, arranged in order of pitch, and sounding a series of eight consecutive notes of the chromatic scale. The phantom striking head shows the position of the interior striking head when the mallet is rotated 180° about the axis of its handle.

FIGURE 2 is a side view of another embodiment of this invention which has four striking heads. The phantom striking heads shown illustrate the position of the two interior striking heads when the mallet is rotated by 180° about the axis of its handle.

Referring to FIGURE 1, a looped wire handle 1 is affixed by a means of soldering or welding to a bent wire cross piece 2. Hard rubber striking heads 3, 4 and 5 are attached to the two ends of cross piece 2 and to the end of a wire extension 6 of handle 1, so that the striking heads are on a line with each other, the ratio of the distance of each end striking head 3 and 5 from the middle striking head 4 being essentially 3:4, as illustrated by horizontal line XX, which is divided up into sections of equal length for the purpose of illustrating the spatial arrangement of the striking heads.

When the mallet illustrated in FIGURE 1 is used to strike an arrangement of bells; for example, a scale of bells comprising a chromatic scale, and when the bells are arranged in their order of pitch and equally spaced apart so that striking heads 3 and 5 span eight bells and strike the first and eighth bells of the span, then, in one position, striking head 4 will strike the fourth note of the note struck by head 3 creating a minor triad chord and upon rotating the mallet about the axis of its handle, striking head 4 will strike the fifth note of the note struck by head 3, creating a major triad chord.

More specifically, FIGURE 1 shows the mallet resting upon eight bells arranged in a chromatic scale beginning with C and ending with G, each bell being labeled with the letter corresponding to the note which it sounds when struck. When the mallet strikes the C note with striking head 3, and the note G with striking head 5, the fourth note D sharp-E flat will simultaneously be struck by striking head 4 when the mallet is in the position shown, resulting in a C minor triad chord. When the mallet is turned over so that the middle striking head is in the position shown by the phantom drawing 4a, the note E will be struck in conjunction with C and G, sounding a C major triad. When used with a chomatic scale of bells, the mallet of FIGURE 1 can strike every major and minor triad chord of the scale simply by shifting the mallet along the scale and striking the bells with one side or the other of the mallet.

Referring to FIGURE 2, wire handle 10 and the extensions thereof 11 and 12 carry a bent cross piece 13, which is affixed to the handle. The four wire ends of handle 10 and cross piece 13 carry striking heads 14, 15, 16 and 17, which are typically made of hard rubber. The striking heads are arranged on a line with each other and are so spaced that middle striking head 15 is a distance of three linear units of any length desired from end head 14, middle striking head 16 is spaced a distance of two of the same linear units away from head 15, and end head 17 is spaced a distance of two of the same units away from middle head 16, as shown by line Q—Q, which is subdivided into sections of equal length. When struck on a series of bells encompassing a major diatonic scale which are uniformly spaced in line in order of increasing tone so that heads 14 and 17 strike bells which have a tone an octave apart, the mallet of FIGURE 2 imparts full and rich chords. In FIGURE 2 the bells are not shown to avoid an overcomplex drawing, but the letters above line Q—Q denote locations for a major diatonic scale of bells ranging one octave from middle to high C. In the above situation, in which heads 14 and 17 strike the bells which sound middle and high C respectively, the chord so struck is technically known as a subdominant chord of C in second inversion, i.e. the notes C, F, A and C. A different rich chord is obtained when the mallet is rotated about the axis of its handle by 180°, so that the middle striking heads assume the positions shown by the phantom drawings 15a and 16a, striking different notes. The chord struck in this particular instance is the tonic major triad chord of C with doubling at the octave, i.e. the notes C, E, G and C.

The invention of this application, however, resides in the chord-striking mallet, and is not limited by the arrangement of the bells with which it is used. Any arrangement of bells desired can be used, including minor scales as well as major and chromatic scales.

The mallet of this invention not only provides an interesting and entertaining method of playing chords from arrangements of bells, particularly for those who are musically untrained and who would be able to find and play chords only with difficulty without the aid of this mallet, but the mallet of this invention also is an educational tool for gaining a preliminary insight into the nature and relationship of chords.

If desired, mallets having more than four striking heads can be prepared in accordance with this invention.

Although a preferred embodiment of the invention has been described in considerable detail, it will be understood that the description thereof is intended to be illustrative, rather than restrictive, as many details of structure may be modified or changed without departing from the spirit or scope of the invention. Accordingly, it is not desired to be restricted to the exact structure described.

What is claimed is:

1. A mallet for striking chords on a linearly-arranged plurality of devices, each of which produces a single tone upon being struck, comprising a looped wire handle, a wire cross piece affixed to said wire handle, and at least three striking heads affixed to wire ends of said wire handle and cross piece, said striking heads being in spaced relationship and colinear with each other in an asymmetrical arrangement.

References Cited

UNITED STATES PATENTS

| | | | |
|---|---|---|---|
| 479,636 | 7/1892 | Droop | 84—422 |
| 775,813 | 11/1904 | Fornander | 84—422 |
| 1,237,873 | 8/1917 | Deagan | 84—403 |
| 1,761,245 | 6/1930 | Vitto | 84—404 |

RICHARD B. WILKINSON, Primary Examiner

JOHN F. GONZALES, Assistant Examiner